United States Patent
Zheng et al.

(10) Patent No.: US 9,465,743 B2
(45) Date of Patent: Oct. 11, 2016

(54) METHOD FOR ACCESSING CACHE AND PSEUDO CACHE AGENT

(71) Applicant: Huawei Technologies Co., Ltd., Shenzhen, Guangdong (CN)

(72) Inventors: Wei Zheng, Hangzhou (CN); Jiangen Liu, Hangzhou (CN); Gang Liu, Hangzhou (CN); Weiguang Cai, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 580 days.

(21) Appl. No.: 13/719,626

(22) Filed: Dec. 19, 2012

(65) Prior Publication Data
US 2013/0111142 A1   May 2, 2013

Related U.S. Application Data

(63) Continuation of application No. PCT/CN2011/080489, filed on Sep. 30, 2011.

(51) Int. Cl.
G06F 12/00 (2006.01)
G06F 12/08 (2016.01)

(52) U.S. Cl.
CPC ......... *G06F 12/084* (2013.01); *G06F 12/0806* (2013.01); *G06F 12/0811* (2013.01); *G06F 2212/1012* (2013.01)

(58) Field of Classification Search
CPC ................................................. G06F 12/0862
See application file for complete search history.

(56) References Cited

U.S. PATENT DOCUMENTS

| 5,829,052 | A | 10/1998 | Pawlowski et al. |
| 6,108,764 | A * | 8/2000 | Baumgartner et al. ......... 712/28 |
| 6,253,292 | B1 | 6/2001 | Jhang et al. |
| 6,662,276 | B2 * | 12/2003 | Schoinas ............... G06F 12/082 711/144 |

(Continued)

FOREIGN PATENT DOCUMENTS

| CN | 10150191 A | 8/2009 |
| CN | 102063406 A | 5/2011 |
| CN | 102075907 A | 5/2011 |
| CN | 102103568 A | 6/2011 |
| CN | 102137167 A | 7/2011 |

OTHER PUBLICATIONS

Chinese Search Report in corresponding Chinese Patent Application No. 201180001881.3 (Aug. 6, 2012).

(Continued)

*Primary Examiner* — Gurtej Bansal
(74) *Attorney, Agent, or Firm* — Leydig, Voit & Mayer, Ltd.

(57) ABSTRACT

Embodiments of the present invention disclose a method for accessing a cache and a pseudo cache agent (PCA). The method of the present invention is applied to a multiprocessor system, where the system includes at least one NC, at least one PCA conforming to a processor micro-architecture level interconnect protocol is embedded in the NC, the PCA is connected to at least one PCA storage device, and the PCA storage device stores data shared among memories in the multiprocessor system. The method of the present invention includes: if the NC receives a data request, obtaining, by the PCA, target data required in the data request from the PCA storage device connected to the PCA; and sending the target data to a sender of the data request. Embodiments of the present invention are mainly applied to a process of accessing cache data in the multiprocessor system.

4 Claims, 6 Drawing Sheets

(56) References Cited

U.S. PATENT DOCUMENTS

| | | | |
|---|---|---|---|
| 2003/0009631 A1* | 1/2003 | Arimilli | G06F 12/0817 |
| | | | 711/135 |
| 2008/0140942 A1 | 6/2008 | Kornegay et al. | |
| 2008/0175271 A1* | 7/2008 | Yeom | 370/468 |
| 2008/0229023 A1* | 9/2008 | Plamondon | 711/126 |
| 2010/0049921 A1 | 2/2010 | Aronovich et al. | |
| 2010/0217949 A1* | 8/2010 | Schopp | G06F 9/5077 |
| | | | 711/173 |
| 2011/0211553 A1 | 9/2011 | Haddad | |

OTHER PUBLICATIONS

1$^{st}$ Office Action in corresponding Chinese Patent Application No. 201180001881.3 (Sep. 25, 2012).

Extended European Search Report in corresponding European Patent Application No. 11858865.6 (Jun. 26, 2013).

International Search Report in corresponding PCT Patent Application No. PCT/CN2011/080489 (May 3, 2012).

Lenoski et al., "The Directory-Based Cache Coherence Protocol for the DASH Multiprocessor," 1990, Institute of Electrical and Electronics Engineers, New York, New York.

* cited by examiner

METHOD FOR ACCESSING CACHE AND PSEUDO CACHE AGENT

CROSS-REFERENCE TO RELATED APPLICATIONS

This application is a continuation of International Application No. PCT/CN2011/080489, filed on Sep. 30, 2011, which is hereby incorporated by reference in its entirety.

FIELD OF THE INVENTION

The present invention relates to the field of computer technologies, and in particular, to a method for accessing a cache and a pseudo cache agent.

BACKGROUND OF THE INVENTION

In a computer, one or more caches with a small capacity and a high access speed are usually designed between a processor and a memory, for temporarily storing partial data in the memory to facilitate fast access of the processor to data in the cache.

Recently, with the development of computer technologies, multiprocessor systems are widely applied. In a multiprocessor system such as a cache-coherent non uniform memory-access architecture (Cache-Coherent Non Uniform Memory-access Architectures, CC-NUMA), multiple processors are connected together through a node controller (Node Controller, NC) to share the memory. Specifically, when specific data is required, a certain processor X first accesses a local cache, and if the local cache is not hit, that is, the local cache does not have the specific data required by the processor, a request for sending the specific data is sent to a remote address through a local NC. Because the multiple processors share the memory, and the remote cache may store the data required by the processor X, if read access hits a remote cache, and the remote cache stores the specific data required by the processor X, the data is sent to the processor X that initially sends a data request. Therefore, if the data required by the processor is in a remote cache with a long transmission path in a network topology, a time delay occurring when accessing the remote cache is long, and the cache access efficiency is reduced.

In order to improve the local data hit rate and the cache access efficiency, in the prior art, a remote dedicated cache is added on the node controller, for temporarily storing data at a remote address. Specifically, in the case that the access to the local cache is not hit, the processor accesses the remote dedicated cache, and if the remote dedicated cache is still not hit, the processor accesses the remote cache corresponding to the remote address. By storing data of a remote memory in a local remote dedicated cache, the time of access to the remote memory data of the processor is shortened and the local data hit rate and the cache access efficiency are improved.

In the process of accessing the cache, the inventor finds that the prior art at least has the following problem: as the remote dedicated cache is underlying hardware added for a local physical layer, and cannot be identified by a node controller on a protocol layer, an interface module of the remote dedicated cache needs to be separately designed, so that the problem of high development costs occurs.

SUMMARY OF THE INVENTION

Embodiments of the present invention provide a method for accessing a cache and a pseudo cache agent, so that the development costs of a node controller can be reduced, on the basis that the local data hit rate and the cache access efficiency are improved.

Embodiments of the present invention employ the following technical solutions.

A method for accessing a cache is provided, which is applied to a multiprocessor system, where the system includes at least one node controller (NC), at least one pseudo cache agent (PCA) conforming to a processor micro-architecture level interconnect protocol is embedded in the NC, and the PCA is connected to at least one PCA storage device. The method includes:

if the NC receives a data request, obtaining, by the PCA, target data required in the data request from the PCA storage device connected to the PCA, where the PCA storage device stores partial memory data; and sending the target data to a sender of the data request.

A pseudo cache agent (PCA) is provided, which applied to a multiprocessor system, where the system includes at least one NC and at least one processor connected to the NC, at least one PCA conforming to a processor micro-architecture level interconnect protocol is embedded in the NC, the PCA is connected to at least one PCA storage device, and the PCA storage device stores data shared among memories of the PCA storage device. The PCA includes:

a data obtaining module, configured to, when the NC receives a data request, obtain target data required in the data request from the PCA storage device connected to the PCA; and a sending module, configured to send the target data obtained by the data obtaining module to a sender of the data request.

A node controller is provided, where the node controller includes: at least one pseudo cache agent (PCA); and an PCA storage device connected to the PCA.

According to the method for accessing a cache and the pseudo cache agent provided by embodiments of the present invention, at least one pseudo cache agent (Pseudo Cache Agent, PCA) conforming to the processor micro-architecture level interconnect protocol and the PCA storage device connected to the PCA are added on the NC, and the same as a cache, the PCA storage device temporarily stores partial data required by the processor, so that the hit rate of the processor in a local domain and the cache access efficiency are improved. Because the PCA conforms to the processor micro-architecture level interconnect protocol and has the same external performance as an ordinary cache, a protocol interface module can be used repeatedly, and no interface needs to be separately designed, so that the development costs are reduced.

BRIEF DESCRIPTION OF THE DRAWINGS

To describe the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention.

DETAILED DESCRIPTION OF THE EMBODIMENTS

The technical solutions of embodiments of the present invention are clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
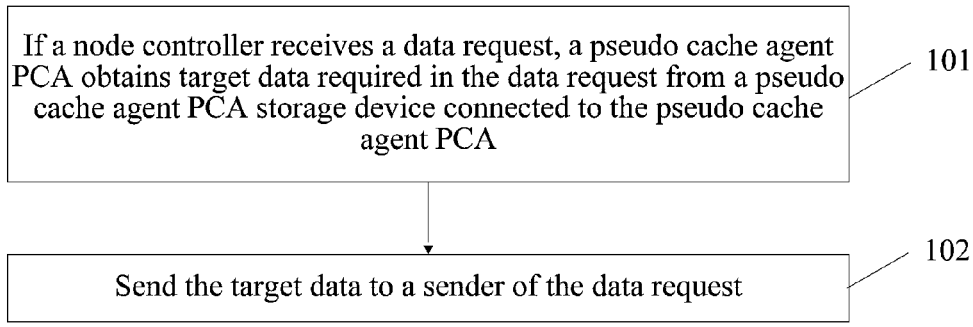
FIG. 1 is a flow chart of a cache access method according to Embodiment 1 of the present invention.

An embodiment of the present invention provides a method for accessing a cache, applied to a multiprocessor system, where the system includes at least one node controller (NC), at least one pseudo cache agent (PCA) conforming to a processor micro-architecture level interconnect protocol is embedded in the NC, and the PCA is connected to at least one PCA storage device. As shown in FIG. 1, the method includes the following steps:

101: If the NC receives a data request, the PCA obtains target data required in the data request from the PCA storage device connected to the PCA.

At least one PCA conforming to the processor micro-architecture level interconnect protocol is embedded in the NC, and the PCA is connected to at least one PCA storage device. The same as a conventional cache, the PCA storage device has a feature of high access speed, and temporarily stores data shared among memories in the multiprocessor system, so as to facilitate fast access of a processor.

102: Send the target data to a sender of the data request.

According to the method for accessing a cache provided by the embodiment of the present invention, at least one PCA conforming to the processor micro-architecture level interconnect protocol and the PCA storage device connected to the PCA are added on the NC, and the same as a cache, the PCA storage device temporarily stores partial data required by the processor, so that the hit rate of the processor in a local domain and the cache access efficiency are improved. Because the PCA conforms to the processor micro-architecture level interconnect protocol and has the same external performance as an ordinary cache, a protocol interface module can be used repeatedly, and no interface needs to be separately designed, so that the development costs are reduced.

Embodiment 2

Figure 2:
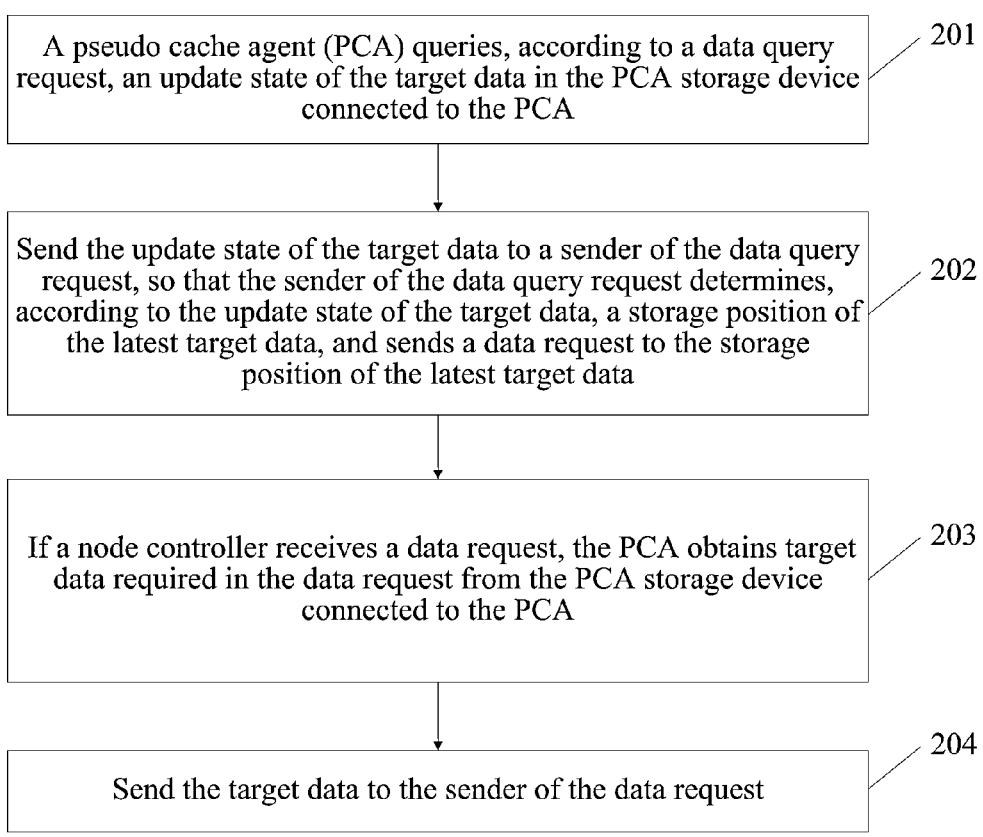
FIG. 2 is a flow chart of a cache access method according to Embodiment 2 of the present invention.

An embodiment of the present invention provides a method for accessing a cache, applied to a multiprocessor system, where the system includes at least one node controller (NC), at least one pseudo cache agent (PCA) conforming to a processor micro-architecture level interconnect protocol is embedded in the NC, the PCA is connected to at least one PCA storage device, and the PCA storage device stores data shared among memories in the multiprocessor system. As shown in FIG. 2, the method includes the following steps:

201: The PCA queries, according to a data query request, an update state of the target data in the PCA storage device connected to the PCA.

In the embodiment, when requiring specific memory data, a processor first searches a memory and a cache that are connected to the processor, and if neither of the cache and memory of the processor is hit, the processor multicasts or broadcasts the data query request to the multiprocessor system.

202: Send the update state of the target data to a sender of the data query request, so that the sender of the data query request determines, according to the update state of the target data, a storage position of the latest target data and sends a data request to the storage position of the latest target data.

Because the memory of the multiprocessor system is shared, the target data may be used by multiple processors and stored in different caches or PCA storage devices, and the target data may be modified after being used, the latest target data needs to be searched for in the system. Specifically, when receiving the data query request, each of the PCAs and caches feeds back an update state message to the sender of the data query request, where the message includes information that indicates whether their respective storage devices store the target data and the modification of the target data. Then, the sender of the data query request determines, according to the update state messages of the target data fed back by the PCAs and caches, a storage position of the latest target data. After determining the storage position of the latest target data, the processor sends a data request to the storage position, so as to obtain the latest target data.

203: If the NC receives the data request, the PCA obtains the target data required in the data request from the PCA storage device connected to the PCA.

If it is determined, according to the update state of the target data, that the latest target data is stored in the PCA storage device in step 202, the processor sends a data request for the target data to the PCA. When the NC receives the data request, the PCA obtains the target data required in the data request from the PCA storage device connected to the PCA.

In the present embodiment, the PCA is a pseudo cache agent that is embedded in the NC and conforms to the processor micro-architecture level interconnect protocol, and the PCA is connected to at least one PCA storage device. The same as a cache, the PCA storage device has a feature of high access speed, is used to temporarily store partial data in the memory, but the PCA storage device is not dedicated to any one processor, and it performs data query, data sending, and data update on the NC, so the PCA storage device is referred to as a pseudo cache.

204: Send the target data to the sender of the data request.

After obtaining the target data, the PCA sends the target data to the sender of the data request. The data request may be a data request sent by a processor directly connected to the NC, or may be a remote data request forwarded by another NC through the network, or may be a data request for prefetching data sent by another PCA.

Figure 3:
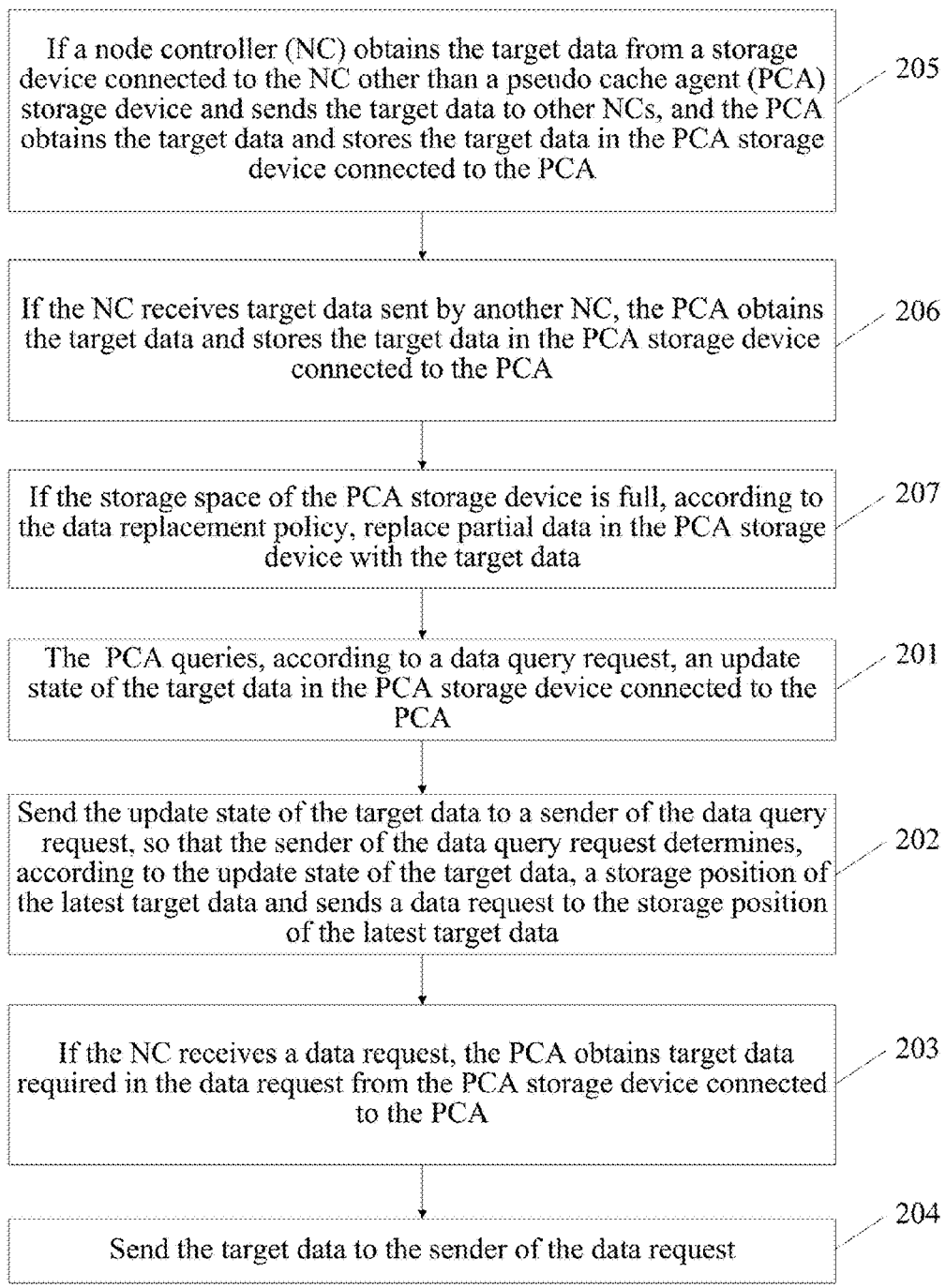
FIG. 3 is a flow chart of another cache access method according to Embodiment 2 of the present invention.

Further, as shown in FIG. 3, in order to implement local data update in the PCA storage device and improve the hit rate of a remote processor on the PCA, the data updated through a local NC is stored in the PCA storage device. The method further includes the following step:

205: If the NC obtains the target data from a storage device connected to the NC other than the PCA storage device and sends the target data to other NCs, the PCA obtains the target data and stores the target data in the PCA storage device connected to the PCA.

Because the PCA storage device is located on a node controller rather than the processor connected to the node controller, when the remote processor accesses the local cache and PCA storage device, the access path of the PCA storage device is shorter than the access path of the cache, and the access speed is higher. Therefore, by storing, in the PCA storage device, the data used and updated by the local processor, the access efficiency may be improved.

Further, in order to update remote data in the PCA storage device and improve the hit rate of the local processor on the PCA, the data received by the local NC is stored in the PCA storage device. The method further includes the following step:

206: If the NC receives the target data sent by another NC, the PCA obtains the target data and stores the target data in the PCA storage device connected to the PCA.

Because the PCA storage device is located on a node controller rather than the processor connected to the node controller, when a local processor accesses the local cache and PCA storage device, the access path of the PCA storage device is shorter than the access path of the cache, therefore, the access speed is higher. The data obtained and used by the processor connected to the local NC is stored in the PCA storage device, so that the PCA with a shorter access path is hit when another processor connected to the local NC uses the data again.

Further, in order to prevent that data in the PCA storage device overflows, a predetermined data replacement policy is set on the PCA, and partial existing data in the PCA is replaced with the target data. The method further includes the following step:

207: If the storage space of the PCA storage device is full, replace partial data in the PCA storage device with the target data according to the data replacement policy.

The purpose of using the data replacement policy is to store, according to the spatial locality and the temporal locality, the data that is most likely to be used in the PCA, and the replacement policy may be a least recently used (Least Recently Used, LRU) algorithm or another replacement algorithm, which is not limited in the embodiment of the present invention.

Figure 4:
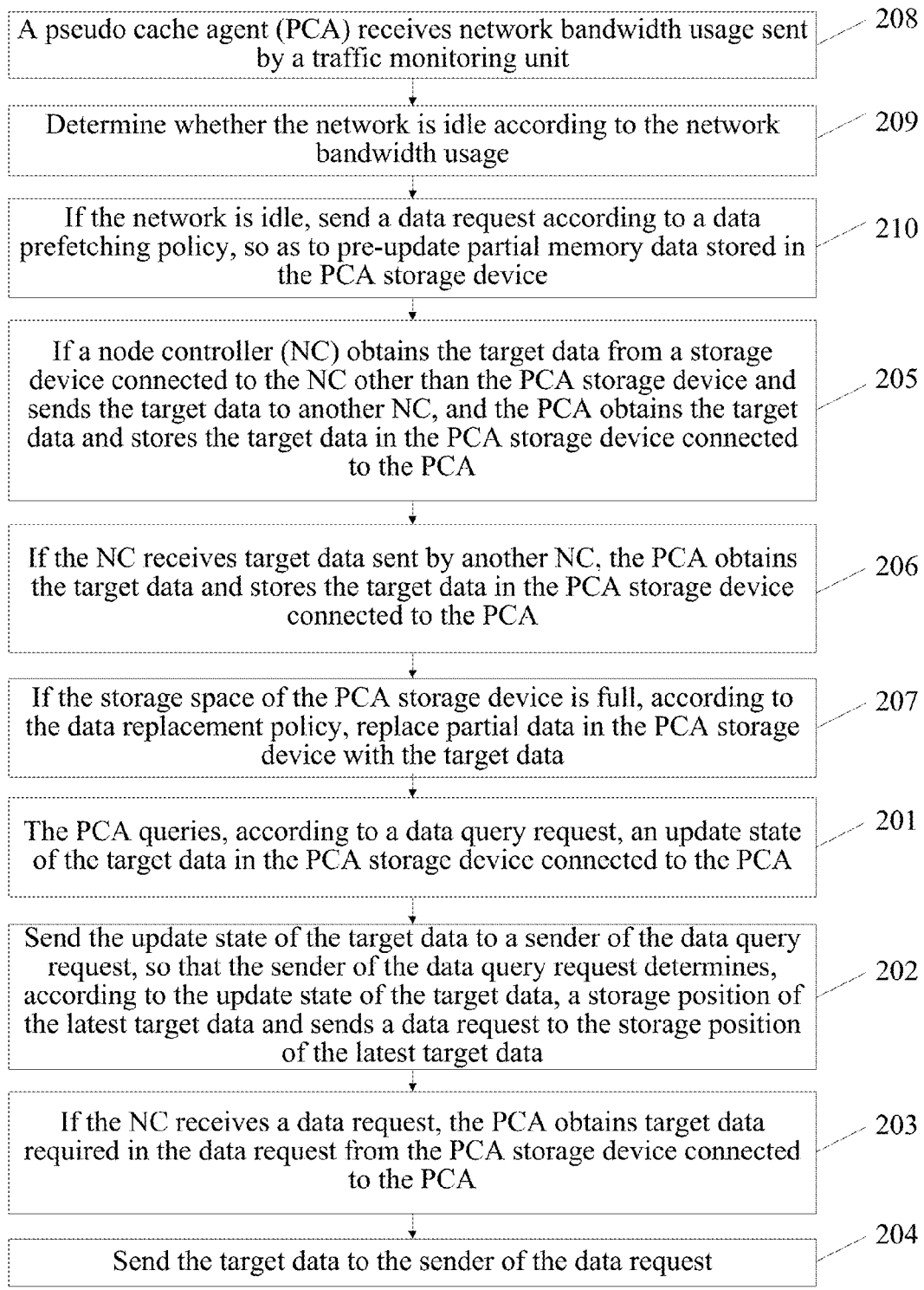
FIG. 4 is a flow chart of another cache access method according to Embodiment 2 of the present invention.

Further, as shown in FIG. 4, in order to further improve the data hit rate of the processor in the local PCA, the data that is more likely to be used by the local processor is pre-read into the PCA storage device, and a traffic monitoring unit is further embedded in the NC. The method further includes the following steps:

208: The PCA receives network bandwidth usage sent by the traffic monitoring unit.

209: Determine whether the network is idle according to the network bandwidth usage.

210: If the network is idle, send a data request according to a data prefetching policy, so as to pre-update partial memory data stored in the PCA storage device.

The data prefetching policy may be, according to a specific application statistical rule, sending a data request for specific data to at least one memory or cache to improve the data hit rate in the PCA storage device. A specific prefetching policy may be determined according to a data usage situation of the multiprocessor system, which is not limited in the embodiment of the present invention.

According to the method for accessing a cache provided by the embodiment of the present invention, at least one PCA conforming to the processor micro-architecture level interconnect protocol and the PCA storage device connected to the PCA are added on the NC, and the same as a cache, the PCA storage device temporarily stores partial data required by the processor, so that the hit rate of the processor in a local domain and the cache access efficiency are improved. Because the PCA conforms to the processor micro-architecture level interconnect protocol and has the same external performance as an ordinary cache, a protocol interface module can be used repeatedly, and no interface needs to be separately designed, so that the development costs are reduced.

Embodiment 3

For the convenience of understanding the methods of the present invention by persons skilled in the art, this embodiment provides an application example of a multiprocessor system based on the quickpath interconnect (QuickPath interconnect, QPI) protocol.

Figure 5:
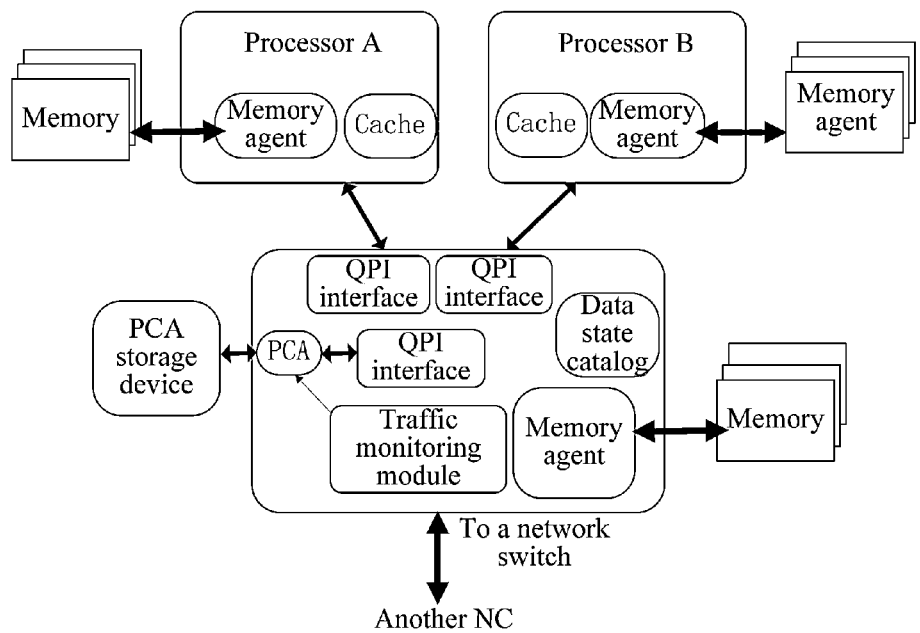
FIG. 5 is a schematic constitutional diagram of a multiprocessor system according to Embodiment 3 of the present invention.

As shown in FIG. 5, the multiprocessor system includes at least one node controller (NC) and at least one processor (a processor A and a processor B) connected to the NC. At least one pseudo cache agent (PCA) conforming to a processor micro-architecture level interconnect protocol is embedded in the NC, and the PCA is connected to at least one PCA storage device.

When requiring specific data, the processor A first searches the cache on the processor A, and if the cache is not hit, the processor sends a data query request to other caches and PCAs in the multiprocessor system. Then, each of the caches and PCAs feeds back an update state of the target data to the processor A, and the processor A, according to the update states of the target data that are fed back, determines a storage position of the latest target data.

If the PCA storage device stores the latest target data, the processor sends a data request for the target data to the PCA. The PCA obtains, according to the data request, the target data from the PCA storage device and sends the target data to the processor A.

Further, in order to implement the data update of the PCA storage device and improve the data hit rate in the PCA storage device, the PCA may store the data used and updated by the processor A and the processor B in the PCA storage device, or may store the data sent by other NCs in the PCA storage device, so as to obtain the data in the PCA when a processor uses the data again.

Further, in order to prevent that data in the PCA storage device overflows, a pre-determined data replacement policy is employed to replace existing data in the PCA storage device with the latest target data.

Further, in order to further improve the data hit rate of the local processor in the PCA storage device, a traffic monitoring unit is added on the NC and configured to send network bandwidth usage to the PCA. When the PCA receives the network bandwidth usage and determines that the network is in an idle state, the PCA may send a data request for prefetching data according to a pre-determined prefetching policy, so as to obtain data from a local or remote storage unit, thereby improving the access hit rate of the processor.

According to the method for accessing a cache provided by the embodiment of the present invention, at least one PCA conforming to the processor micro-architecture level interconnect protocol and the PCA storage device connected to the PCA are added on the NC, and the same as a cache, the PCA storage device temporarily stores partial data required by the processor, so that the hit rate of the processor in a local domain and the cache access efficiency are improved. Because the PCA conforms to the processor micro-architecture level interconnect protocol and has the same external performance as an ordinary cache, a protocol interface module can be used repeatedly, and no interface needs to be separately designed, so that the development costs are reduced.

Embodiment 4

The embodiment of the present invention provides a pseudo cache agent (PCA), applied to a multiprocessor system, where the system includes at least one node controller (NC) and at least one processor connected to the NC, at least one PCA conforming to a processor micro-architecture level interconnect protocol is embedded in the NC and the NC is connected to at least one PCA storage device, and the PCA storage device stores data shared among memories of the PCA storage device.

Figure 6:
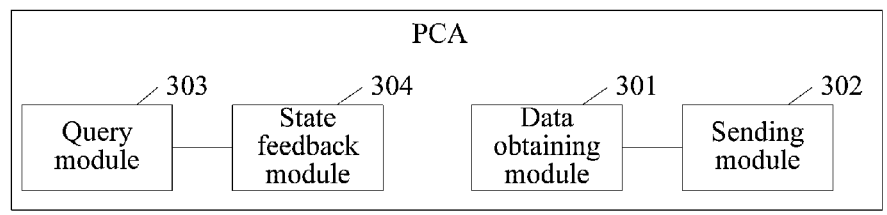
FIG. 6 is a schematic constitutional diagram of an PCA according to Embodiment 4 of the present invention.

As shown in FIG. 6, the PCA includes:

a data obtaining module 301, configured to, when the node controller (NC) receives a data request, obtain target data required in the data request from an PCA storage device connected to the PCA; and a sending module 302, configured to send the target data obtained by the data obtaining module 301 to a sender of the data request.

The PCA storage device is a storage unit embedded in the NC or a storage unit externally connected to the NC.

Furthermore, the PCA further includes:

a query module 303, configured to, before the NC receives the data request, query, according to a data query request, an update state of the target data in the PCA storage device connected to the PCA; and a state feedback module 304, configured to send the update state of the target data found by the query module 303 to the sender of the data query request, so that the sender of the data query request determines, according to the update state of the target data, a storage position of the latest target data and sends a data request to the storage position of the latest target data.

Figure 7:
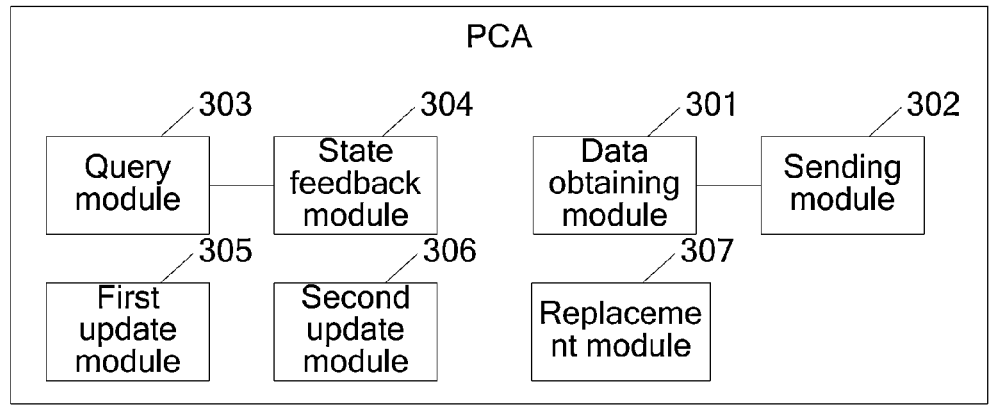
FIG. 7 is a schematic constitutional diagram of another PCA according to Embodiment 4 of the present invention.

Further, as shown in FIG. 7, in order to update local data in the PCA storage device and improve the data hit rate in the PCA storage device, the PCA further includes:

a first updating module 305, configured to, when the NC obtains the target data from a storage device connected to the NC other than the PCA storage device and sends the target data to other NCs, obtain the target data and store the target data in the PCA storage device connected to the PCA.

Furthermore, the PCA further includes:

a second updating unit 306, configured to, when the NC receives the target data sent by another NC, obtain the target data and stores the target data in the PCA storage device connected to the PCA.

Further, in order to prevent that the data in the PCA storage device overflows, the PCA further includes:

a replacement module 307, configured to, when the storage space of the PCA storage device is full, replace partial data in the PCA storage device with the target data according to a predetermined data replacement policy.

Figure 8:
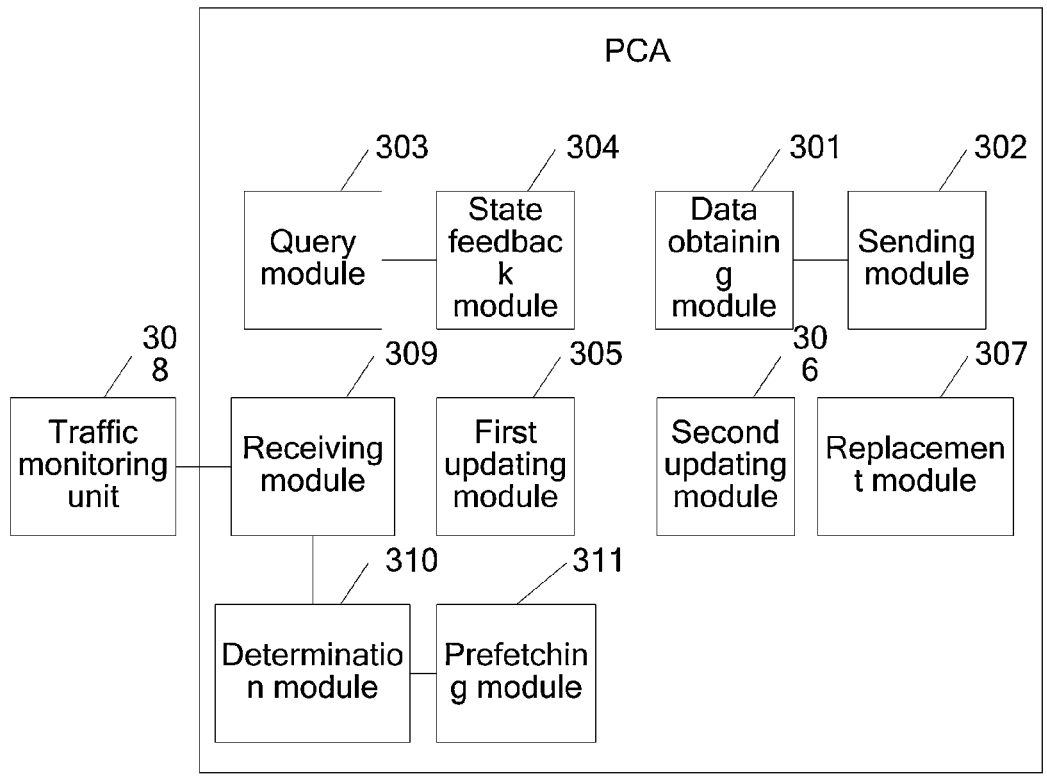
FIG. 8 is a schematic constitutional diagram of a node controller according to Embodiment 4 of the present invention.

Further, as shown in FIG. 8, a traffic monitoring unit 308 is further embedded in the NC, and the PCA further includes:

a receiving module 309, configured to receive network bandwidth usage sent by the traffic monitoring unit 308;

a determination module 310, configured to determine whether the network is idle according to the network bandwidth usage received by the receiving module 309; and a prefetching module 311, configured to, when the determination module determines that the network is idle, send a data request according to a data prefetching policy, so as to pre-update partial memory data stored in the PCA storage device.

It should be noted that, for the description of partial functional modules of the PCA, reference may be made to corresponding content in Embodiments 1 to 3, which is not described again in the embodiment of the present invention.

Figure 9:
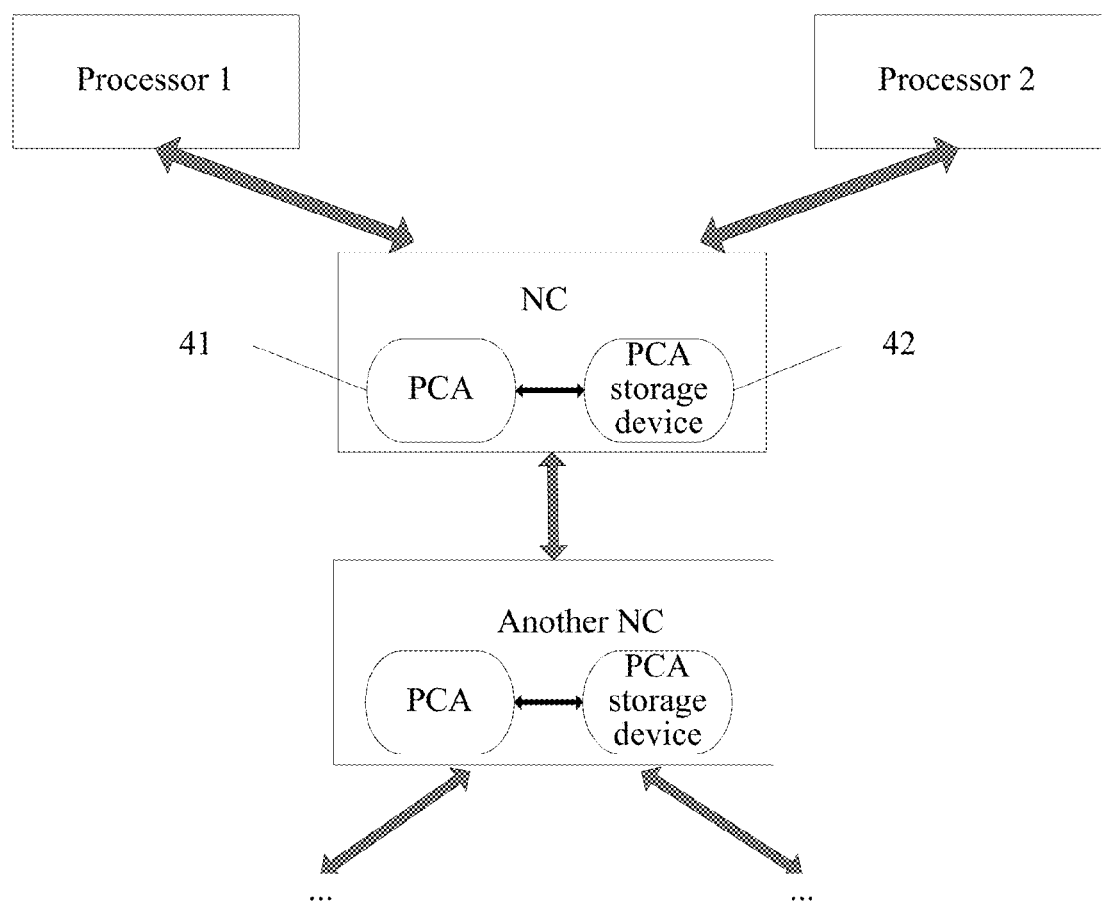
FIG. 9 is a schematic constitutional diagram of a multiprocessor system according to Embodiment 4 of the present invention.

The embodiment of the present invention further provides a node controller, applied to a multiprocessor system. As shown in FIG. 9, the node controller includes: at least one pseudo cache agent (PCA) 41 and an PCA storage device 42 connected to the PCA.

It should be noted that, for the description of partial functional modules in the node controller, reference may be made to corresponding content in Embodiment 1 to 3 and the PCA part in Embodiment 4, which is not described again in the embodiment of the present invention.

According to the PCA and node controller provided by the embodiment of the present invention, at least one PCA conforming to the processor micro-architecture level interconnect protocol and the PCA storage device connected to the PCA are added on the NC, and the same as a cache, the PCA storage device temporarily stores partial data required by the processor, so that the hit rate of the processor in a local domain and the cache access efficiency are improved. Because the PCA conforms to the processor micro-architecture level interconnect protocol and has the same external performance as an ordinary cache, a protocol interface module can be used repeatedly, and no interface needs to be separately designed, so that the development costs are reduced.

Through the above description of the embodiments, it is clear to persons skilled in the art that the present invention may be accomplished by software plus necessary universal hardware, and definitely may also be accomplished by hardware, but in many cases, the software implementation is preferred. Based on this, the technical solutions of the present invention or the part that makes contributions to the prior art can be substantially embodied in the form of a software product. The computer software product is stored in a readable storage medium, for example, a floppy disk, hard disk, or optical disk of the computer, and contains several instructions used to instruct computer equipment (for example, a personal computer, a server, or network equipment) to perform the methods according to the embodiments of the present invention.

The above descriptions are merely exemplary embodiments of the present invention; however, the protection scope of the present invention is not limited thereto. Changes or replacements readily apparent to persons skilled in the art within the technical scope of the present invention should fall within the protection scope of the present invention. Therefore, the protection scope of the present invention is subject to the appended claims.

What is claimed is:

1. A multiprocessor system, comprising:
at least two processors connected by a node controller (NC), wherein the NC is used to transfer data requests between the processors, and wherein each of the processors has a dedicated cache for storing data,
a pseudo cache agent (PCA) which is located in the NC conforming to a processor micro-architecture level interconnect protocol,
wherein the PCA is configured to:
pre-fetch target data from a dedicated cache controlled by one of the processors, when network is idle, and
write the target data into a PCA storage device, wherein the PCA storage device is coupled to the PCA and is dedicated to the PCA, and wherein the PCA storage device is accessible only to the PCA,
wherein a first processor is configured to:
receive a data request which includes an address of the target data,
determine whether the target data is stored in a dedicated cache corresponding to the first processor based on the address, and
send the data request to the NC to instruct the NC to forward the data request to a second processor if the target data is not stored in the dedicated cache corresponding to the first processor, and
wherein the PCA is further configured to:
receive the data request from the first processor,
determine that the target data is stored in the PCA storage device based on the address,
obtain the target data from the PCA storage device, and
send the target data to the first processor.

2. The multiprocessor system according to claim 1, the PCA is further configured to determine that the target data is latest data by checking an update state of the target data, before obtaining the target data from the PCA storage device.

3. A method for a node controller (NC) sending data to a processor in a multiprocessor system, wherein the multiprocessor processor includes at least two processors connected by the NC which is used to transfer data requests between the processors, wherein each of the processors has a dedicated cache for storing data, and wherein the multiprocessor system further includes a pseudo cache agent (PCA) which is located in the NC conforming to a processor micro-architecture level interconnect protocol; the method comprising:
pre-fetching, by the PCA, target data from a dedicated cache controlled by one of the processors, when network is idle;
writing, by the PCA, the target data into a PCA storage device, wherein the PCA storage device is coupled to the PCA and is dedicated to the PCA, and wherein the PCA storage device is accessible only to the PCA;
receiving, by a first processor, a data request including an address of the target data;
determining, by the first processor, whether the target data is stored in a dedicated cache corresponding to the first processor based on the address;
sending, by the first processor, the data request to the NC to instruct the NC to forward the data request to a second processor if the target data is not stored in the dedicated cache corresponding to the first processor;
receiving, by the PCA, the data request;
determining, by the PCA, that the target data is stored in the PCA storage device based on the address;
obtaining, by the PCA, the target data from the PCA storage device; and
sending, by the PCA, the target data to the first processor.

4. The method according to the claim 3, the method further comprising:
determining, by the PCA, that the target data is latest data by checking an update state of the target data, before obtaining the target data from the PCA storage device.

* * * * *